United States Patent
McDonald

Patent Number: 5,419,801
Date of Patent: May 30, 1995

[54] HEAT SEALS

[75] Inventor: Ian W. McDonald, Wells, England

[73] Assignee: Food Machinery Design Limited, England

[21] Appl. No.: 68,410

[22] Filed: May 28, 1993

[30] Foreign Application Priority Data

May 28, 1992 [GB] United Kingdom ............... 9211299

[51] Int. Cl.⁶ .............................................. B32B 31/00
[52] U.S. Cl. ............................ 156/581; 156/583.1; 156/583.3; 156/583.4
[58] Field of Search ............... 156/580, 581, 583.1, 156/583.3, 583.4, 515; 100/93 P

[56] References Cited

U.S. PATENT DOCUMENTS

| | | | |
|---|---|---|---|
| 2,390,550 | 12/1945 | Moore | 156/581 |
| 3,083,618 | 4/1963 | Vergobbi | 93/35 |
| 4,001,075 | 1/1977 | Menzner et al. | 156/581 |
| 4,079,570 | 3/1978 | Rucker | 156/581 X |
| 4,582,555 | 4/1986 | Bower | |
| 4,761,197 | 8/1988 | Christine et al. | 156/290 |
| 5,015,223 | 5/1991 | Boeckmann | 493/194 |
| 5,021,117 | 6/1991 | Boeckmann | 156/515 |
| 5,078,040 | 12/1991 | Davis | 53/551 |

FOREIGN PATENT DOCUMENTS 380364 9/1964 Switzerland .

Primary Examiner—David A. Simmons
Assistant Examiner—J. Sells
Attorney, Agent, or Firm—Bacon & Thomas

[57] ABSTRACT

A pair of heat seal jaws (31, 32) for heat sealing together two heat sealable polymeric surfaces (33, 33'), the jaws (31, 32) including first sealing surfaces (36) which in use cooperate to produce at least one relatively strong heat seal between the said polymeric surfaces (33, 33') and second heat sealing surfaces (37, 38) which in use cooperate to produce at least one relatively weak but substantially hermetic heat seal between the polymeric surfaces, said first and second heat sealing surfaces being disposed relative to each other so that during heat sealing of the polymeric surfaces, polymer in the vicinity of the second heat sealing surfaces can flow away from the relatively weak seal to produce a substantially hermetic seal as the relatively weak seal is being formed.

7 Claims, 1 Drawing Sheet

HEAT SEALS

BACKGROUND OF THE INVENTION

1. Technical Field of the Invention

This invention concerns heat seals and in particular heat seal jaws for forming such seals.

2. Description of the Prior Art

The heat sealing of polymeric films is a widely used procedure, two film surfaces being brought into intimate contact at elevated temperatures whereby polymer from the two surfaces is caused to coalesce to form a heat seal. Such procedures are widely used in the packaging art, for example in the packaging of products using vertical or horizontal form-fill-seal machines.

SUMMARY OF THE INVENTION

Increases in the speed of packaging machines have placed increasing demands on not only the packaging machines themselves, but also on the polymers which form the surfaces which are brought together by the machines to form the seals. Developments in polymer technology have produced films which have particularly low heat seal thresholds combined with high hot tack strengths, so that heat seals can be produced rapidly without long dwell times which would be needed to heat the contacting film surfaces to the required temperature to form the seals. However, seal integrity is often inadequate at these higher speeds, particularly when hermetic seals are required.

Proposals have also been made for improving the mechanics of bringing the film surfaces which are to be sealed together into more intimate contact during the heat sealing process. Attention has in particular been paid to the formation of transverse heat seals between packages, increased film-to-film contact being achieved by the use of heat seal jaws having complementary surfaces of substantially saw tooth cross-section. However, when heat sealing is effected using such jaws, although the contacting film surfaces tend to be brought together under pressure where the respective tips of the saw teeth contact the film, little or no pressure is applied to the contacting films between adjacent teeth on opposing jaws. The result is that poor sealing tends to occur in these regions of the seal between the saw tooth tips, and indeed air and/or misplaced product can become trapped in these regions.

In addition to the problems caused by increases in the speed of packaging machinery, the design of the packages themselves can also cause problems with seal formation. For example, transverse seals formed by form-fill-seal machines in general have to be formed through at least two thicknesses of heat sealable packaging material. Not only does heat from the sealing jaws which form these seals have to pass through more than one layer of heat sealable film, the jaws are often unable to bring the various layers into adequate contact to form hermetic seals, as will be described in greater detail herein with reference to the accompanying drawings.

Problems associated with heat sealing polymeric films through different numbers of layers of film are further increased when the packages are formed with side gussets. In these cases it is not unusual to have to form transverse heat seals through four or even six thicknesses of film immediately adjacent to regions where the heat seal is formed through only two thicknesses of film. This often results in air being able to enter the sealed packages via the interface between these differences in thickness of packaging film even if the heat seal jaws have a saw tooth cross section. Furthermore, air which is often trapped in regions of the seal between the saw teeth because the contacting film layers in these regions are not subjected to adequate pressure from the heat seal jaws during the sealing process can also facilitate the passage of air through the seals.

It has been proposed hitherto to increase the contact pressure between the contacting film surfaces during heat sealing by truncating at least some of the saw teeth of the heat seal jaws so that during the heat sealing process polymer can flow into the resulting increased space between the tips of the teeth of one jaw and the roots of the teeth of the cooperating jaw. The disadvantage of such heat seal jaws is that they do not compensate for differences in the numbers of layers of film along the length of a transverse heat seal, and, furthermore, the necessary polymer flow along the interface between the contacting surfaces to produce the desired improved seal still tends to be relatively poor compared with that at the tooth tips. Thus although such prior art heat seal jaws may produce an improvement in heat seals through only two layers of film, leaks in the seals can still occur where the number of thicknesses of film change.

The problem of sealing through a number of different thicknesses of heat sealable packaging film also becomes greater the thicker the film which is being heat sealed because in order for the heat seal jaws to apply pressure to the thinner regions of the transverse section of the seals as they are being formed, the thicker sections have to be compressed to a total thickness which is less than the combined thicknesses of the thinner sections or pressure cannot be applied to the thinner sections. The thicker the film the more difficult this process becomes since more polymer has to be moved from the regions where the jaw teeth of one jaw cooperate with the roots of the teeth of the other jaw in order for the jaws to close more tightly together.

According to the present invention there is provided a pair of heat seal jaws for heat sealing together two heat sealable polymeric surfaces, the jaws including first sealing surfaces which in use cooperate to produce at least one relatively strong heat seal between the said polymeric surfaces and second heat sealing surfaces which in use cooperate to produce at least one relatively weak but substantially hermetic heat seal between the polymeric surfaces, said first and second heat sealing surfaces being disposed relative to each other so that during heat sealing of the polymeric surfaces, polymer in the vicinity of the second heat sealing surfaces can flow away from the relatively weak seal to produce a substantially hermetic seal as the relatively weak seal is being formed.

The relatively strong heat seals can be produced using heat sealing means which produce seals over a relative large area, for example sets of cooperating teeth or flat jaws, e.g. using two cooperating metal surfaces or a metal surface cooperating with a resilient surface, but which form seals which are usually unsatisfactory at producing hermetic seals, especially where the seals are to be formed through different numbers of layers of heat sealable material. The relatively weak heat seals will usually be produced in the form of a line seal, for example using a single tooth or land on one of the jaws. Such single teeth or lands will usually cooperate with a substantially plane surface on the other jaw, although they can cooperate with another single tooth or land on the other jaw. However, it is preferred that the surface with which the single tooth or land cooperates does not significantly impede the flow of polymeric material, air or product away from the weak seal as it is being formed.

It is generally preferred that heat seal jaws in accordance with the present invention include two sets of first and second heat sealing surfaces so that two sets of strong and weak seals are formed substantially simultaneously when the jaws are closed.

In general, it is preferred that the relatively strong seal be nearer to the contents of packages which are formed using heat seal jaws in accordance with the present invention, with the relatively weak seals being disposed outwardly from the relatively strong seals. Relatively weak hermetic seals can thereby be maintained outwardly of relatively strong non-hermetic seals, thereby maintaining the contents of the packages in an hermetic state.

BRIEF DESCRIPTION OF THE FIGURES OF DRAWINGS

An embodiment of the present invention will now be described with reference to the accompanying diagrammatic drawings in which.

DETAILED DESCRIPTION OF THE PREFERRED EMBODIMENTS

Figure 1:
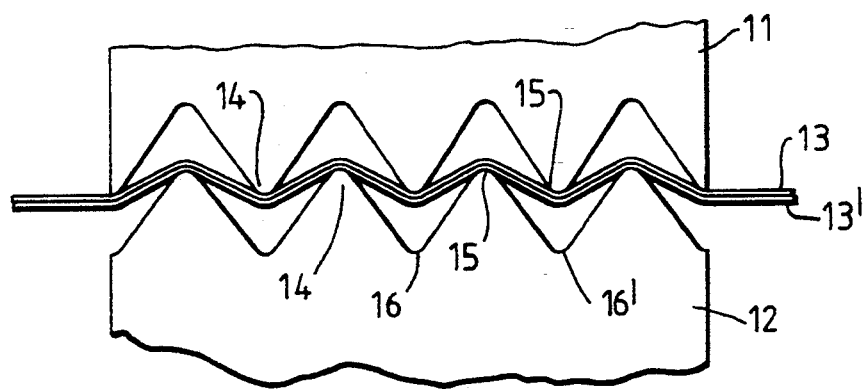
FIG. 1 is an end view of a pair of prior art heat seal jaws.

The prior art heat seal jaws shown in FIG. 1, include an upper heat seal jaw 11 and a lower heat seal jaw 12, and they are shown in the process of forming a heat seal between two layers of heat sealable polymeric film 13,13', the jaws being viewed from the side so that the heat seal will eventually be formed in a plane substantially perpendicular to the plane of the drawing. The jaws 11 and 12 are shown partially closed and in the process of forming the heat seal, at which stage the two layers of film 13,13' have started to become deformed to the contours of the teeth 14 of the respective jaws 11 and 12.

As will be appreciated by those skilled in the art, the heat seal jaws shown in FIG. 1 will in general include a second set of teeth of substantially the same form of construction and form a second transverse heat seal when the jaws are closed. A cutter blade (not shown) disposed between the two sets of jaws is used to cut the heat sealable material between the two resulting heat seals, for example to separate a formed package from a package which is in the process of being formed.

Heat from the tips 15 of the various teeth 14 is transferred to the film 13,13' in the region of the tips 15, and as the jaws 11 and 12 close together, the tips 15 effectively apply an increasing compressive force to the contacting layers of film 13,13' in the region of the tips 15 which brings about heat sealing between the layers of film 13,13', the tips 15 attempting to push the layer in contact with them through the other layer against the tensile stresses in the other layer. However, regions of the layers of film 13,13' between the tip 15 of a particular tooth 14 and either of its adjacent roots 16,16' are neither in contact with a tooth 14, so that heating of the film in these regions is relatively poor, and there is no compressive force applied to the layers by the teeth 14, nor is there any significant relative movement between the layers in these regions which might bring about intermingling of polymer between the layers in these regions and thereby bring about heat sealing.

Since the tips 15 of the teeth 14 are of substantially the same profile as the roots 16,16' with which they cooperate to form a heat seal, polymer from the layers of film 13,13' cannot flow to any significant extent from one region of the film to another. This has the disadvantage of preventing significant pressure from being applied to the layers of film 13,13' over the whole of their contacting surfaces until the jaws are fully closed. A further disadvantage of these prior art heat seal jaws is that if some regions of the heat seal which is being formed have more than two thicknesses of film, for example if a longitudinal fin seal down the length of the package which is being formed extends down the centre line of the rear of the package, there is nowhere for the polymer of the additional thicknesses of film to flow, thereby effectively holding the heat seal jaws 11 and 12 apart and preventing the pressure which it applied to the jaws 11 and 12 to close them from being applied over the whole seal area.

It has been proposed hitherto to modify the profile of the teeth 14 so that at least some of the tips 15 are truncated, thereby leaving gaps between a truncated tip of one jaw and the root of the other jaw with which it cooperates and into which polymer from the films which are being heat sealed, air and contamination can flow. However, even these modified heat seal jaws do not deal satisfactorily with differences in the number of layers of film across the width of a seal, particularly with relatively thick films.

Figure 2:
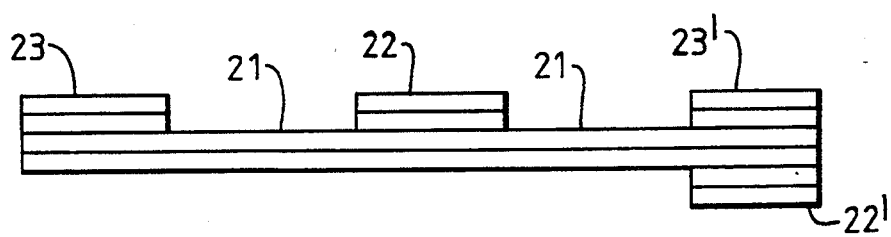
FIG. 2 shows schematically the differences in thickness of heat sealable packaging material which can occur along the length of a heat seal.

FIG. 2 shows schematically the problems of having different numbers of layers of film along the length of a transverse seal imposes on transverse heat seal jaws, the film being viewed transversely to the direction of film flow in producing packages. The different numbers of layers of film are shown schematically as a number of blocks, but as will be appreciated, the film extends in a continuous manner from a fin seal 22 through side gussets 23 and 23' back to the seal 22. This drawing also shows an alternative situation in which a fin seal 22' is formed in the region of the gusset 23'.

Most regions 21 of the film are of double thickness, but the fin seal 22 formed down the length of the package is four layers thick. The gussets 23,23' are four layers thick, and there are six layers when a longitudinal seal 22' is present.

As will be appreciated, in order for heat seal jaws to make compressive contact with the outer surfaces of the combined thicknesses of film across the full width of the film during the formation of a heat seal, it will be necessary to reduce the thickness of the central region 22 and the outer region 23 by at least one half of its original thickness and that of the outer regions 23' to less than one third of its original thickness. Such reductions in thickness are not possible with the prior art heat seal jaws of FIG. 1 since there is nowhere for the polymer which has to be displaced to flow in order for this to happen.

Figure 3:
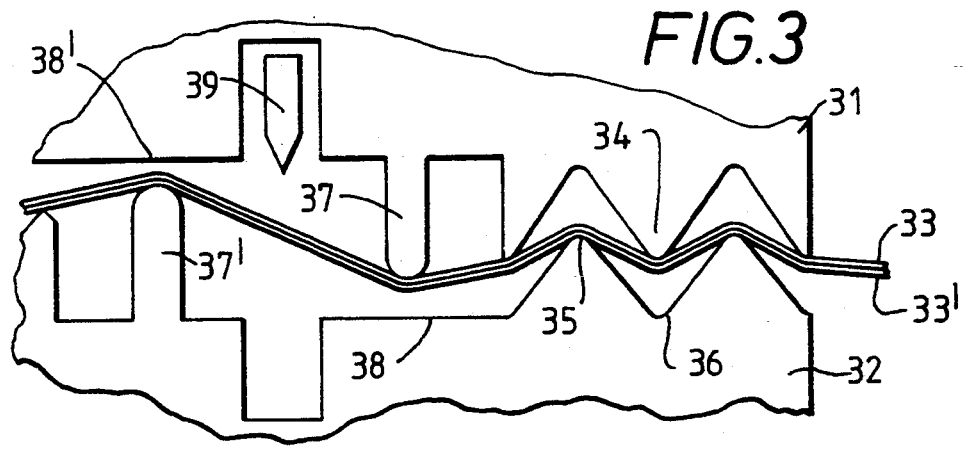
FIG. 3 is a pars cut away end view of a pair of heat seal jaws in accordance with the present invention.

FIG. 3 shows a part cut away view of heat seal jaws in accordance with the present invention. The illustrated jaws 31 and 32 have two sets of cooperating teeth 34 which are similar to the teeth 14 described in relation to FIG. 1 and function in a similar manner thereto. Since each set of teeth functions in substantially the same manner as those illustrated in FIG. 1, the left hand set has been shown partially cut away. The upper jaw 31 also has a single longitudinal tooth or land 37 which is spaced from the teeth 34 and extends along the length of the jaw 31 so that in use it forms a line seal across the width of the packages which are formed. The lower jaw 32 likewise includes a single longitudinal tooth or land 37' which is spaced from the second set of teeth and extends along the length of the jaw 32. Instead of cooperating with another tooth or land on the jaws 32 and 31 respectively, the lands 37 and 37' cooperate with a substantially planar portions 38, 38' of the respective jaws 32 and 31 to form two linear heat seals when the jaws 31 and 32 are brought together with a heat sealable packaging material therebetween. The relative heights of the lands 37 and 37' and the teeth 34 are such that when the heat seal jaws 31 and 32 are closed with the heat sealable packaging material therebetween, a satisfactory heat seal through only two thicknesses of the packaging material is formed by the lands 37 and 37', and the cooperating surface of the lower jaw 32.

The lands 37 and 37' are spaced from the teeth 34 so that as the lands 37 and 37' are moved nearer to the respective planar portions 38 and 38' of the opposing jaws 32 and 31 as the jaws 31 and 32 are closed, polymer from the packaging material adjacent the region of contact between the packaging material and the lands 37 and 37', and product contamination and air, can flow away from the lands 37 and 37' substantially in the plane of the packaging material. If the lands 37, 37' and the teeth 34 are too close together, this polymer flow can be inhibited, thereby reducing the effectiveness of the lands 37, 37' at causing a sufficient reduction in the thickness of the film to enable an hermetic line seal to be formed through different numbers of film thickness of film across the length of the transverse pack seal which is being formed.

Once the heat sealing has been effected, a cutter blade 39 can be actuated in known manner to cut the packaging material between the two lands 37 and 37'.

As will be appreciated by those skilled in the art, although the single lands 37 and 37' are shown in FIG. 3 as cooperating with substantially planar regions 38, 38' of the heat seal jaws 32, 31, they could be arranged to cooperate with non-planar surfaces on the opposing jaws, for example they could be arranged to cooperate with another single land on the opposing jaw 32 or 31, respectively. However, if cooperating single lands are used on each of the jaws 31 and 32, they should in general be so disposed that their tips rather than other portions thereof cooperate to form a line seal. It will also be appreciated that lands 37 and 37' can be present on only one of the jaws rather than having one on each as shown in the drawings.

Heat seal jaws in accordance with the present invention can be used to heat seal a wide variety of heat sealable packaging materials, but especially heat sealable polymeric films. However, since the particular benefit of the use in accordance with the present invention of a single heat sealing land spaced from any other heat sealing surfaces of the jaws is the ability to form good seals simultaneously through different numbers of layers of packaging materials, the present invention is of particular value in heat sealing polymeric films where the heat sealable portion thereof represents a significant proportion of the total film thickness, and more particularly where the reduction in thickness is achieved by flow of the heat sealable material away from the line seal.

Heat seal jaws in accordance with the present invention are therefore of particular value in heat sealing polymeric films which are mono-webs of heat sealable polymers, for example of polyethylene, or multi-layer films in which the heat sealable layer or layers represent a major portion of the total film thickness. Examples of multi-layer films which can be heat sealed include combinations of layers of nylon with layers polyethylene, and layers of polyesters with polyethylene. Heat seal jaws in accordance with the present invention can also be used to heat seal metallised polymeric films, but the polymer content of such films should in general be such as to permit polymer flow as described herein before. Packaging materials consisting of polymeric webs laminated to paper can also be heat sealed using heat seal jaws in accordance with the present invention.

Although the heat seal jaws in accordance with the present invention which have been particularly described with reference to the accompanying drawings form a combination of a single weak seal and a single strong, hermetic seal at each end of each the packages which is produced therewith, it will be appreciated that heat seal jaws in accordance with the present invention can include more than one of either or both of the means for forming weak and strong seals such that one or more weak and/or strong seals can be formed at either or both ends of the packages sealed thereby.

The present invention also includes packages produced using heat seal jaws in accordance with the present invention.

I claim:

1. A pair of heat seal jaws for heat sealing together two heat sealable polymeric surfaces, the jaws including first sealing surfaces which in use cooperate to produce at least one relatively strong heat seal between the said polymeric surfaces and second heat sealing surfaces which in use cooperate to produce at least one relatively weak but substantially hermetic heat seal between the polymeric surfaces, said first and second heat sealing surfaces being disposed apart relative to each other thereby defining a space so that during heat sealing of the polymeric surfaces as the heat seal jaws are closed, polymer from the polymeric surfaces adjacent to the region of contact between the polymeric surfaces and the second heat sealing surfaces can flow away from the relatively weak seal substantially in the plane of the polymeric surfaces into the space to produce a substantially hermetic seal as the relatively weak seal is being formed.

2. Heat seal jaws according to claim 1, wherein the first heat sealing surfaces comprise cooperating sets of heat seal teeth.

3. Heat seal jaws according to claim 1, wherein the first heat sealing surfaces comprise a resilient surface which in use cooperates with a substantially non-resilient planar or toothed surface.

4. Heat seal jaws according to claim 1, wherein the second heat sealing surfaces form at least one line seal.

5. Heat seal jaws according to claim 4, wherein the line seal or seals are formed by heated teeth or lands.

6. Heat seal jaws according to claim 1, including two sets of said first heat sealing surfaces and said second heat sealing surfaces so that two pairs of strong and weak seals are formed substantially simultaneously between the said two heat sealable polymeric surfaces when the jaws are closed.

7. Heat seal jaws according to claim 6, wherein the two sets of said second heat sealing surfaces are disposed relative to each other such that during heat sealing of the polymeric surfaces, polymer in the vicinity of each of the said second heat sealing surfaces can flow away from one of the relatively weak seals towards the other of said second heat sealing surfaces as the said one weak seal is being formed.

* * * * *